United States Patent [19]

Deucker et al.

[11] 3,888,885

[45] June 10, 1975

[54] PROCESS FOR THE PREPARATION OF 4-CHLORO-NAPHTHALIC ACID ANHYDRIDE

[75] Inventors: Walter Deucker, Neuenhain, Taunus; Helmut Troster, Frankfurt am Main, both of Germany

[73] Assignee: Hoechst Aktiengesellschaft, Frankfurt am Main, Germany

[22] Filed: Aug. 28, 1973

[21] Appl. No.: 392,176

[30] Foreign Application Priority Data

Aug. 30, 1972 Germany............................ 2242513

[52] U.S. Cl. ............................................ 260/345.2
[51] Int. Cl................................................ C07d 7/20
[58] Field of Search ................................. 260/345.2

[56] References Cited

UNITED STATES PATENTS 3,646,069    2/1972    Okada et al. .................... 260/345.2

*Primary Examiner*—John M. Ford
*Attorney, Agent, or Firm*—Curtis, Morris & Safford

[57] ABSTRACT

A process for the preparation of 4-chloro-naphthalic acid anhydride, wherein an alkali metal salt of naphthalic acid is chlorinated in an aqueous solution at a pH value of between 6.8 to 9.0 and at a temperature of between 0° to 30°C. By this one-step process 4-chloro-naphthalic acid is obtained in high yields and in a very pure form. It is a valuable intermediate product for the synthesis of dyes in the benzoxanthene and benzothioxanthene series as well as for optical brighteners.

4 Claims, No Drawings

PROCESS FOR THE PREPARATION OF 4-CHLORO-NAPHTHALIC ACID ANHYDRIDE

The present invention relates to a process for the preparation of 4-chloro-naphthalic acid anhydride by chlorinating naphthalic acid anhydride.

4-chloro-naphthalic acid anhydride has, until now, only been accessible by working in several stages. A known method is to take acenaphthene as starting product, to chlorinate it and to oxidize it to 4-chloro-naphthalic acid anhydride. Beside the chlorination of acenaphthene in solvents which leads to isomer mixtures (Chemical Abstracts 64, 14143 1966) especially the oxidation in glacial acetic acid (U.S. Pat. No. 2,37-9,032) or in aromatic solvents (German Offenlegungsschrift No. 1,930,842) with dichromate is very expensive because the material to be used is expensive and the solvents must be regenerated.

According to another method, acenaphthene is sulfonated with chlorosulfonic acid and then oxidized to yield the 4-sulfonaphthalic acid. In the third reaction stage the sulfo group is exchanged against chlorine with potassium chlorate and hydrochloric acid (German Offenlegungsschrift No. 1,470,090). This process, too, comprises several stages, a complicated oxidization reaction and requires, additionally, a sulfonation.

It is the object of the invention to prepare 4-chloronaphthalic acid anhydride from easily accessible naphthalic acid anhydride by direct chlorination in one reaction step and in good yield and quality.

It was found that pure 4-chloro-naphthalic acid anhydride was obtained in a good yield when a solution of naphthalic acid anhydride is reacted in dilute sodium hydroxide solution with chlorine in a narrow pH range. The pH required is maintained during the reaction by continuously adding sodium hydroxide solution.

According to the process of the present invention, chlorine gas is introduced into an aqueous solution of the sodium salt of the naphthalic acid at pH 6.8 – 9.0, preferably, 7.2 – 7.8 until the degree of chlorination required is reached. The pH is maintained in the range desired by adding dropwise at the same time and regularly dilute sodium hydroxide solution.

When chlorinating at pH 7.2 – 7.8, 1.7 – 1.9 moles of chlorine gas per mole of naphthalic acid were led into the reaction solution while stirring in such a manner that no chlorine gas can be established in the exhaust air. After having finished to introduce chlorine, the solution was stirred at a constant pH so long until a sample of the solution did not blue potassium iodide starch paper any more.

When chlorinating at pH 7.8 – 9.0 the amount of chlorine used must be increased to 2.5 – 3.0 moles per mole of naphthalic acid when a satisfying degree of chlorination is desired. Therefore, the amount of sodium hydroxide solution used must also be increased. The yield of 4-chloronaphthalic acid anhydride thereupon already begins to decrease a little. Above pH 9, oxidation is so heavy that the yield of 4-chloronaphthalic acid anhydride is reduced to a high extent while the chlorine consumption is incomparably high.

According to the process of the invention the chlorination is carried out at temperatures ranging from 0° to 30°C, preferably from 10° to 20°C. Below that temperature limit the chlorination reaction only proceeds slowly, and above that limit oxidation processes occur too often beside the chlorination reaction.

The starting product used in the process of the invention for the preparation of 4-chloro-naphthalic acid anhydride is naphthalic acid anhydride which is dissolved together with equivalent amounts of sodium hydroxide solution in water while heated. To accelerate the solution an excess amount of sodium hydroxide solution can be used the pH of which is adjusted to the desired value with acid before the chlorination starts, for example, with hydrochloric acid, sulfuric acid, phosphoric acid or acetic acid.

To dissolve naphthalic acid anhydride and maintain the pH desired there may also be used, besides sodium hydroxide solution, during the chlorination and with the same result, potassium hydroxide solution, sodium carbonate and potassium carbonate or mixtures of these products.

As chlorinating agent there may be used, instead of chlorine gas in the presence of alkali and under otherwise the same conditions also a sodium or potassium hypochlorite solution. The pH desired is maintained in this case by the addition of acid, for example, hydrochloric acid or acetic acid.

After chlorination had been completed, the reaction mixture is worked up according to known methods. After optionally clarifying the mixture by filtration the solution can be acidified with mineral acid at room temperature or at temperatures up to about 90° C, the precipitated chlorinated product can be separated, washed with water and dried at 100° – 120°C. At last when being dried the 4-chloro-naphthalic acid is completely converted into its anhydride. An especially pure product is obtained when the 4-chloro-naphthalic acid so formed is salted out by the addition of sodium ions to the reaction solution, for example, in the form of sodium chloride and/or sodium hydroxide, to yield the disodium salt, separated and converted into the anhydride by introducing it into dilute mineral acid.

According to the conditions chosen in the scope of the process described herein 4-chloronaphthalic acid anhydride is obtained in yields ranging from 75 to 85% of the theoretical amount and having a content of pure substance of 90 to 98%.

The 4-chloro-naphthalic acid anhydride is a valuable intermediate product for the preparation of dyestuffs of the benzoxanthene and benzothioxanthene series and for optical brighteners.

The following Examples illustrate the invention:

EXAMPLE 1

100 g of naphthalic acid anhydride were dissolved at 60°C in 1,600 ml of water and 150 g of sodium hydroxide solution of 33%. At 15° – 20°C the pH was adjusted to 7.3 – 7.6 with acetic acid and about 62 g of chlorine were added so that 455 g of sodium hydroxide solution of 10% were consumed to maintain the pH. Stirring was continued for another 2 to 3 hours, the mixture was acidified with hydrochloric acid, the precipitate was suction-filtered, washed with water and dried at 100° – 120°C. The yield was 97.5 g, the content of pure substance was 92%.

EXAMPLE 2

100 g of naphthalic acid anhydride were dissolved and chlorinated in the manner described in Example 1, but the pH was adjusted with phosphoric acid before the chlorination started. The chlorinated solution was clarified, 100 g of sodium hydroxide solution of 33% and 400 g of sodium chloride were added and the precipitate was rapidly suction-filtered, washed with saturated sodium chloride solution, and filtered. The filter residue was stirred again in 1,200 ml of water and acidified at 70°C with hydrochloric acid. The anhydride was suction-filtered, washed until neutral and dried. The yield was 88 g, the content of pure substance was above 95%.

EXAMPLE 3

100 g of naphthalic acid anhydride were dissolved in the manner described in Example 1, adjusted to pH 8.2 – 8.4 with phosphoric acid and 0° – 5°C about 100 g of chlorine were added so that 1,650 g of sodium hydroxide solution of 10% were consumed to maintain the pH at 8.2 – 8.4. Stirring was continued at the same temperature for 2 – 3 hours, 1,350 g of sodium hydroxide solution of 33% were added, the precipitate was isolated and the anhydride was obtained therefrom as described in Example 2. The yield was 84 g, the content of pure substance was above 95%.

EXAMPLE 4

The process described in Example 1 was repeated while using instead of sodium hydroxide solution the equivalent amount of potassium hydroxide solution. The yield and purity were the same as indicated in Example 1.

EXAMPLE 5

39.6 g of naphthalic acid anhydride were dissolved at 50°C in 800 ml of water and 24.0 g of sodium hydroxide and the solution was adjusted at pH 8.3 – 8.5 with acetic acid. In the course of about 2 hours at 0°– 5°C 250 ml of sodium hypochlorite solution having a chlorine content of 14%, corresponding to 44.5 g of chlorine, were added dropwise. The pH was maintained in the range indicated by adding continuously, at the same time, about 50 ml of 50% acetic acid. After stirring for another 4 hours at 0° – 5°C working up was carried out according to Example 3 while using 580 g of 33% sodium hydroxide solution. The yield was 33.8 g, the purity was above 95%.

What we claim is:

1. A process for the preparation of 4-chloronaphthalic acid anhydride, wherein an alkali metal salt of naphthalic acid is chlorinated in an aqueous solution at a pH value of between 6.8 to 9.0 and at a temperature of from 0° to 30°C.
2. A process as claimed in claim 1 wherein chlorination is effected by chlorine gas.
3. A process as claimed in claim 1 wherein chlorination is effected by sodium or potassium hypochlorite.
4. A process as claimed in claim 1 wherein chlorination is effected at a pH value of between 7.2 to 7.8.

* * * * *